United States Patent
Fowler et al.

(10) Patent No.: US 6,905,137 B2
(45) Date of Patent: Jun. 14, 2005

(54) COMPOSITE CROSS MEMBER SYSTEM

(75) Inventors: Arthur N. Fowler, Greensboro, NC (US); John R. Moodie, Kernersville, NC (US); Wayne Beck, Hoagland, IN (US)

(73) Assignee: Volvo Trucks North America, Inc., Greensboro, NC (US)

(*) Notice: Subject to any disclaimer, the term of this patent is extended or adjusted under 35 U.S.C. 154(b) by 0 days.

(21) Appl. No.: 10/301,000

(22) Filed: Nov. 21, 2002

(65) Prior Publication Data

US 2004/0100085 A1 May 27, 2004

(51) Int. Cl.[7] .......................... B60D 24/00; B60D 21/12
(52) U.S. Cl. ....................................... 280/781; 280/785
(58) Field of Search ................................ 280/781, 785, 280/800; 296/204

(56) References Cited

U.S. PATENT DOCUMENTS

| | | | | |
|---|---|---|---|---|
| 1,723,518 A | * | 8/1929 | Murray, Jr. ................. | 280/800 |
| 1,933,359 A | * | 10/1933 | Archer ....................... | 280/800 |
| 2,154,154 A | * | 4/1939 | Eklund ........................ | 280/800 |
| 4,903,791 A | | 2/1990 | Cameron et al. | |
| 4,976,490 A | | 12/1990 | Gentle | |
| 5,005,864 A | * | 4/1991 | Chachere ..................... | 280/785 |
| 5,215,331 A | | 6/1993 | Pittman | |
| 5,507,522 A | | 4/1996 | Ritchie | |
| 5,720,511 A | | 2/1998 | Benedyk | |
| 5,882,460 A | | 3/1999 | Durand et al. | |
| 5,934,741 A | | 8/1999 | Beukers et al. | |
| 5,992,926 A | | 11/1999 | Christofaro et al. | |
| 6,061,989 A | * | 5/2000 | Trivedi et al. ................. | 52/633 |
| 6,168,226 B1 | | 1/2001 | Wycech | |
| 6,176,502 B1 | | 1/2001 | Blondelet et al. | |
| 6,199,940 B1 | | 3/2001 | Hopton et al. | |
| 6,302,478 B1 | | 10/2001 | Jaekel et al. | |

FOREIGN PATENT DOCUMENTS

| | | | | |
|---|---|---|---|---|
| DE | 3801337 A1 | | 8/1989 | |
| JP | 2151578 A | * | 6/1990 | ........... B62D/21/02 |

OTHER PUBLICATIONS

English Translation of German Patent 3801337A1 Aug. 3, 1989.

* cited by examiner

*Primary Examiner*—Paul N. Dickson
*Assistant Examiner*—Joselynn Y. Sliteris
(74) *Attorney, Agent, or Firm*—Watts Hoffmann, Co., L.P.A.

(57) ABSTRACT

In a frame for an over the highway or off-highway truck or tractor, the frame includes a first and second frame rail and a composite cross-member comprising a first sheet, a second sheet and a core material sheet positioned between the first and second face sheet. The first and second face sheets being made of metal and plastic and the core material being made of any one of wood, plastic, honey-comb, foam and nomex. The first sheet, second sheet and core material sheet are all bonded together to form a cross-member. The cross-member is then mounted to frame rails to construct a truck or tractor frame.

9 Claims, 4 Drawing Sheets

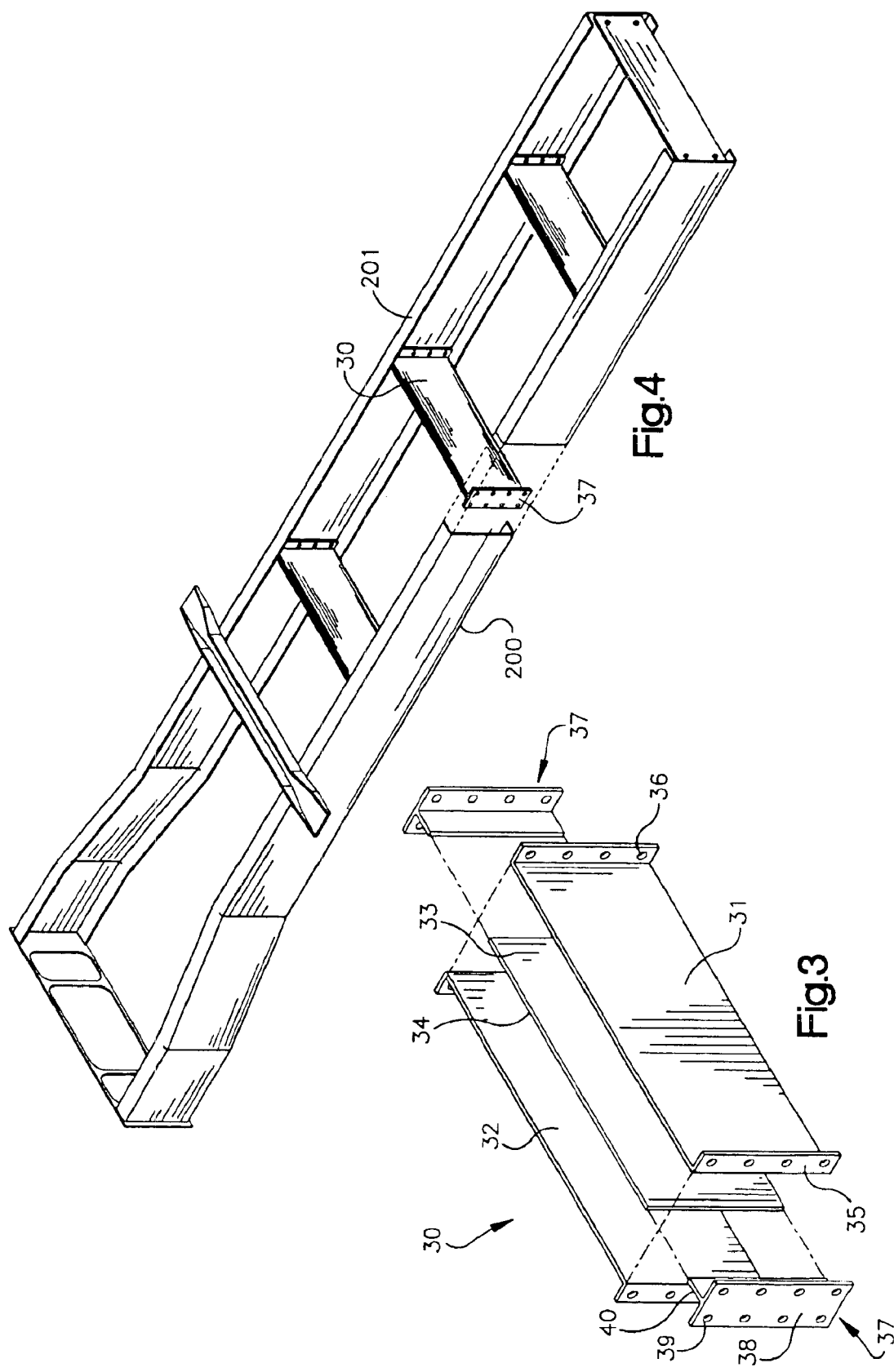

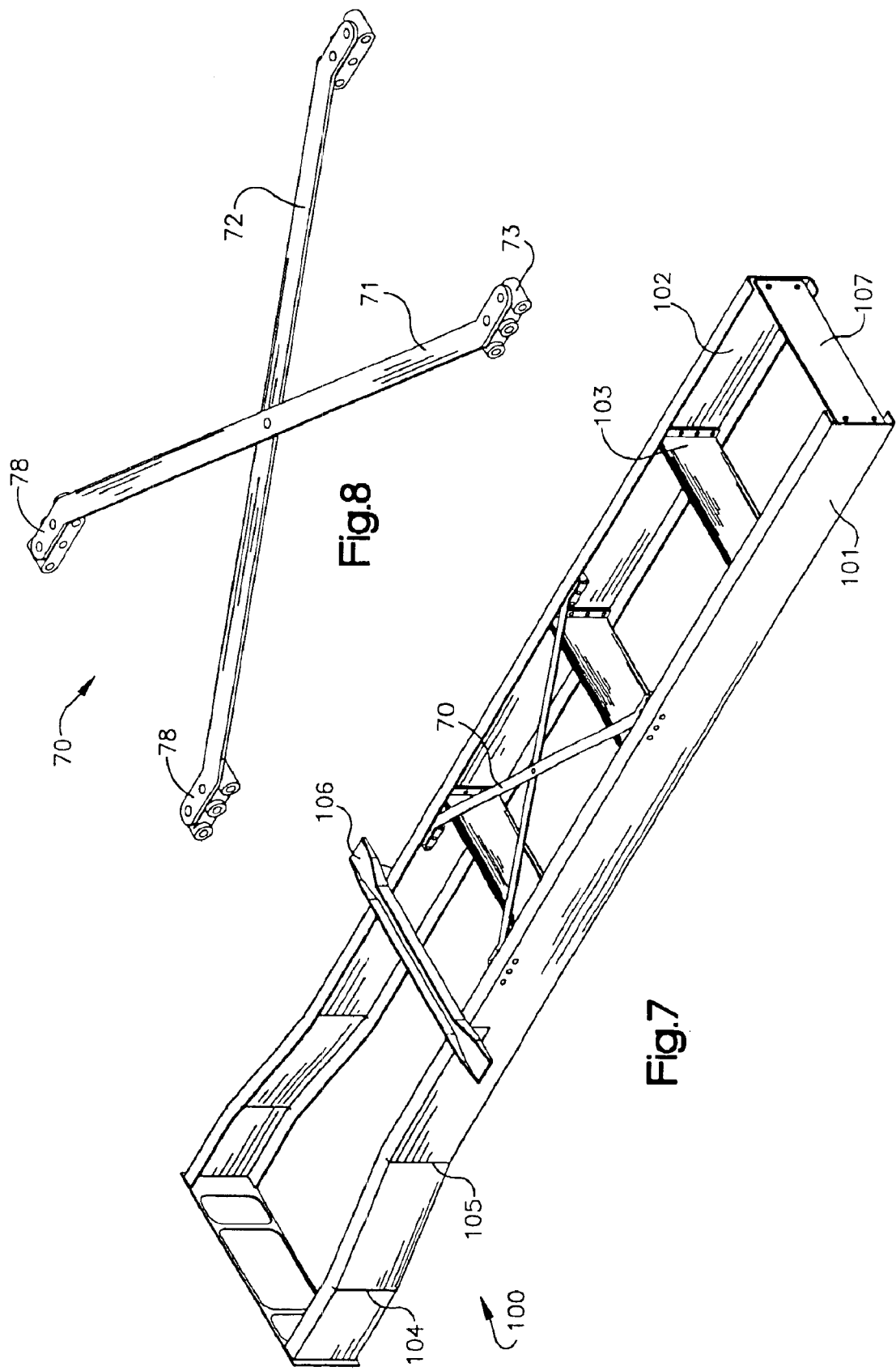

COMPOSITE CROSS MEMBER SYSTEM

FIELD OF THE INVENTION

The present invention relates to a composite cross-members and, more specifically, to a composite cross-members included in a chasis of an over-the-highway or off-highway truck or tractor.

BACKGROUND

Today, the majority of truck and tractor chassis are built around two beams that run the entire length of the vehicle. These beams are traditionally called frame rails. The frame rails are connected to each other by secondary beam structures commonly referred to as cross-members. The primary purpose of these cross-members is to form a rigid structure with the frame rail where forces and loads can be transferred from one frame rail to another so that the frame components work together as a system. A secondary function of the cross-members is to provide a surface for mounting other vehicle components such as pneumatic and electrical lines, pneumatic valves, air tanks, drive shaft supports, axle suspension equipment, engine components and towing devices.

The frame rail and cross-member system is widely used in vehicle manufacturing. As such, there are many different design shapes, materials and concepts used for cross-member construction. Typically, cross-members have a center section that is in the shape of a C-channel and tie plates, which are bolted, riveted and/or welded to ends of the C-channel. Cross-members must provide support for a frame rail that is under stress due to different loads placed on the frame. Typical frame rail stresses include: frame roll, frame twist or shear and frame parallelogramming. Frame roll is defined as stress on the frame where the frame "rolls" to the side about the center of the frame's axis. Frame roll usually results from the load put on the frame by fuel tanks, battery boxes and other components attached to the frame rail. Frame twist or shear occurs where one frame rail is displaced vertically in relation to the other frame rail. Frame parallelogramming occurs when one frame rail is displaced fore and aft in relation to the other frame rail.

FIG. 1 depicts an over-the-highway tractor frame consistent with the prior art. The tractor frame 1 consist of frame rails 2 and 3, a plurality of cross-members 4, an over the transmission cross-member 5 and a rear closing cross-member 6. Such a design includes cross-members that are bulky and heavy. By making the cross-member system with several sections that are heavy, the total weight of the vehicle is increased.

Many cross-member designs do not allow for convenient serviceability. A repair shop making repairs to a cross member system currently needs to cut the old cross-member in half with a torch to remove it. The new cross-member section must be cut, put in place and welded back together. This process is very time consuming and expensive.

There is a need for a cross-member system that is lightweight, able to handle the stress placed on it by the frame rails due to heavy loads and is easily serviced.

SUMMARY OF THE INVENTION

The present invention relates to a frame rail system for a tractor frame and a tractor frame system that includes a composite cross-member. The composite cross member includes a first face sheet and second face sheet. A core material is positioned between the two face sheets. All the components of the composite cross-member are then bonded together.

In one embodiment, each face sheet of the composite cross-member contains an end flange to allow for mounting. The face sheets are secured to a "T" shaped member, which attaches the cross-member to the frame rail. The face sheets, core and "T" shaped member are all bonded together.

In another embodiment, the face sheets are fastened to a mounting bracket. The face sheets and core material form a center section, which is secured between two surfaces of the mounting bracket. The face sheets and core material are bonded together to form the center section. The mounting brackets are then secured to the frame rail. In one embodiment, the mounting brackets are castings.

In yet another embodiment of the invention, a plurality of composite cross-members are positioned orthoganally to the two frame rails to form a frame system for an over-the-highway or off-highway truck or tractor. A stiffening member may be attached to both frame rails over the span of two adjacent composite cross-members to provide extra stiffness in the frame when increased frame system rigidity is needed.

The new design has many advantages over the current design. The new design allows for better serviceability. Service shops can easily remove the cross-member. The new cross-member design can be removed by simply removing the cross-member from the mounting brackets and replacing a new cross-member. Easy removal of the new cross-member saves time and money when service is required.

With the disclosed design, a truck or tractor frame can contain common cross-members. For example, from the second bend in the frame back, excluding the over the transmission cross-member and the rear closing cross-member can be the same. The face sheets of the new design contain flat surfaces on both sides of the cross-member for easier mounting of components such as brake lines, electrical wires and the like. The new cross-member will allow for dramatic weight reduction in the vehicle which in turn leads to lower operating cost of the vehicle. The lighter cross-member can improve a manufacturer's assembly efficiency.

Additional features of the invention will become apparent and a fuller understanding will be obtained by reading the following detailed description in connection with the accompanying drawings.

BRIEF DESCRIPTION OF THE DRAWINGS

FIG. 3 is an exploded view of the first embodiment of a composite cross-member in accordance with the present invention;

FIG. 4 is a perspective view of a truck frame including a composite cross-member according to one embodiment of the present invention with a break away section illustrating the connection of the cross-member to the frame rail;

FIG. 7 is a perspective view of an over-the-highway tractor frame including composite cross-members and stiffening assembly in accordance with the present invention; and, FIG. 8 is a perspective view of a stiffening assembly in accordance with the present invention.

DETAILED DESCRIPTION OF THE PREFERRED EMBODIMENTS

Figure 1:
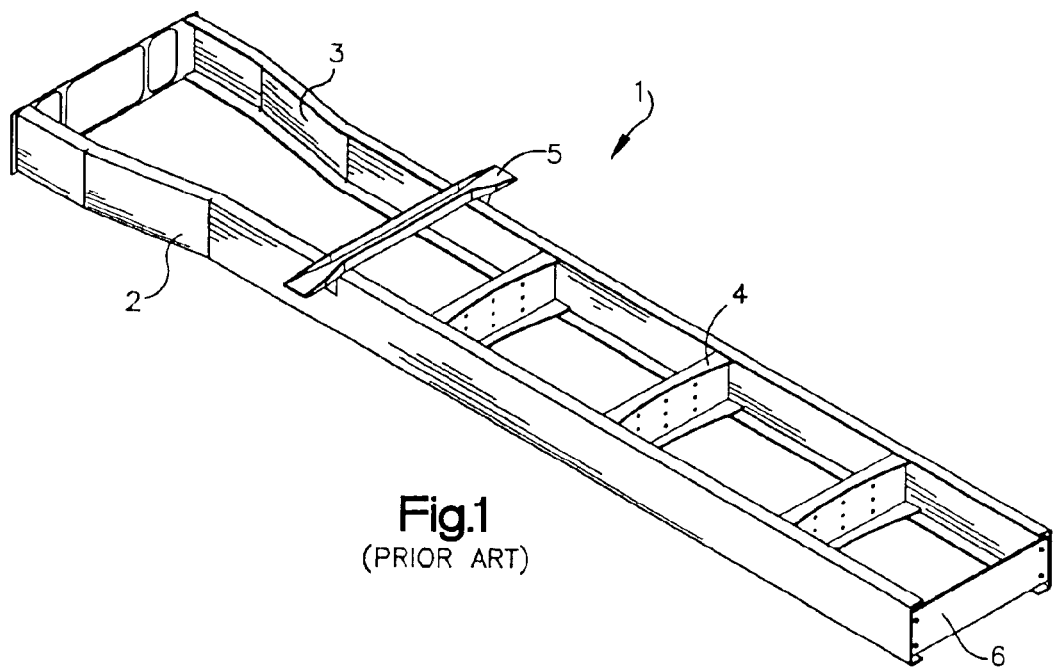
FIG. 1 is a perspective view of a prior art over-the-highway tractor frame, including prior-art cross-member sections.
Figure 2:
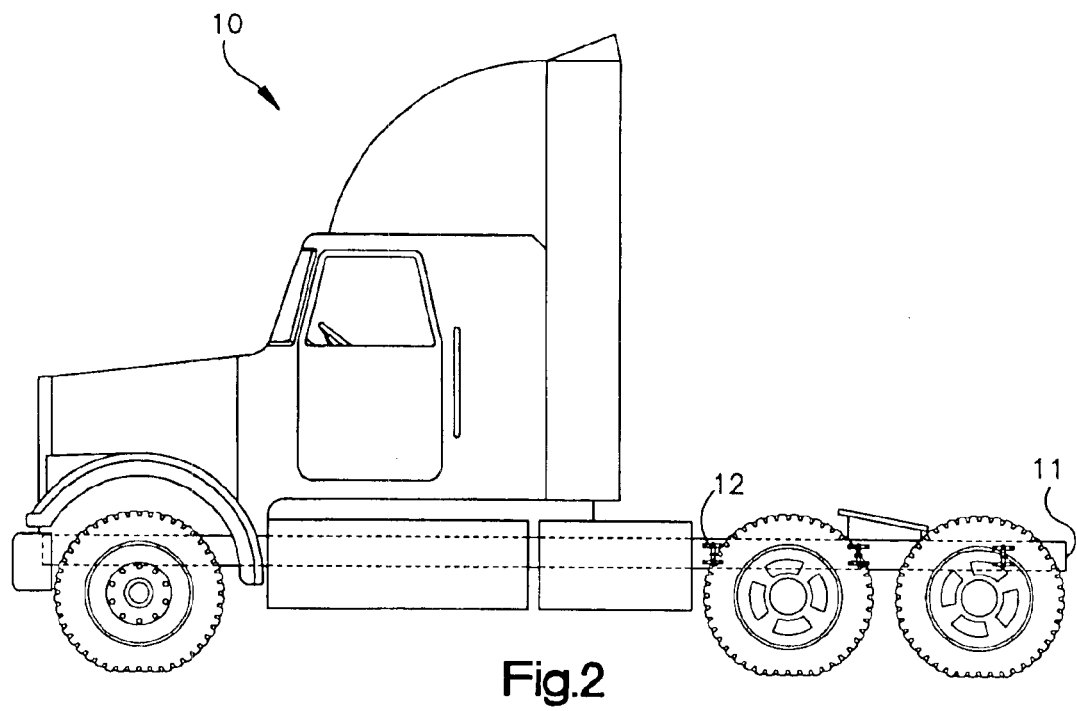
FIG. 2 is an elevational view of an over-the-highway tractor equipped with a composite frame cross-member of the present invention.

Referring now to the drawings, FIG. 2 shows an over-the-highway tractor 10 including a frame 11. The frame 11 includes composite cross-member sections 12 in accordance with the present invention.

Referring to FIG. 3 the composite cross-member 30 includes a first face sheet 31 and a second face sheet 32. The face sheets 31 and 32 can be constructed from any of steel, aluminum, composite, plastic or any other suitable material as known to those of skill in the art. A core material 33 is positioned between the first face sheet 31 and the second face sheet 32. The core material 33 can be constructed from wood, plastic, honeycomb material, aluminum honeycomb, foam, nomex, plastic, any combination of these materials or any other suitable material as known to those of skill in the art. In a preferred embodiment, the core material 33 is bonded to the first face sheet 31 and second face sheet 32 by an adhesive or any other means as known to those skilled in the art. The outer edges 34 of the core material 33 can either be left exposed or covered by some means. These coverings may or may not contribute to the overall structural rigidity of the cross member 30.

The composite frame member 30 can be mounted to the frame rails in one of many ways. Mounting possibilities include but are not limited to welding, bonding or use of threaded fasteners with brackets. In one embodiment of the invention, the first face sheet 31 and second face sheet 32 include at least one end flange 35 at each lengthwise end. Each end flange 35 is turned out away from the center of the cross-member 30 and contains a plurality of holes 36 to allow for securing the face sheets 31 and 32 and "T" shaped members 37 to the frame rails.

The "T" shaped members 37 include a plate portion 38 including a plurality of holes 39 aligned with the holes 36 of the end flanges 35. In addition, each "T" shaped member 37 includes a center flange 40, which extends orthogonally from the plate portion 38, between said first face sheet 31 and second face sheet 32 towards the core sheet 33. The first face sheet 31, second face sheet 32, the "T" shaped mountings 37 and the core material sheet 33 are all bonded together to form one structurally solid composite frame cross-member 30. Such bonding can be in form of an adhesive or any other means as known to those skilled in the art.

In FIG. 4 an over-the-highway truck frame is illustrated with the composite cross-member according to FIG. 3. The frame rails 200 and 201 are connected by at least one composite cross-member 30. The cross-member 30 is attached to the frame rails 200 and 201 by the "T" shaped members 37. The "T" shaped members can be mounted to the frame rails 200 and 201 by fasteners or adhesives or any other means as known to those skilled in the art.

Figure 5:
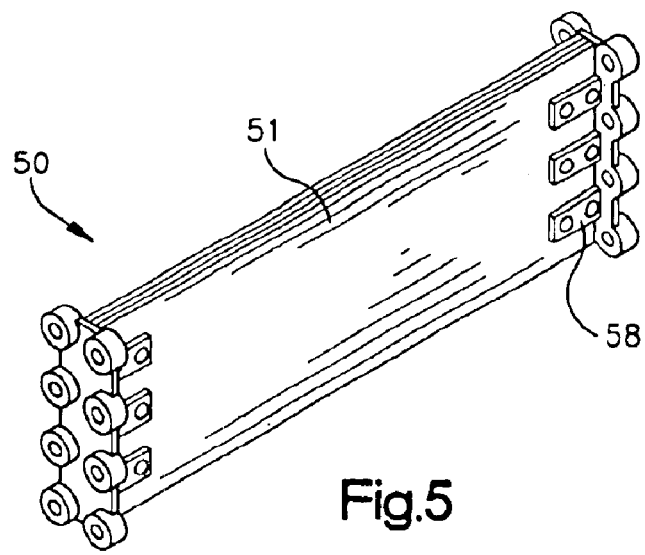
FIG. 5 is a perspective view of one embodiment of a composite cross-member of the present invention.
Figure 6:
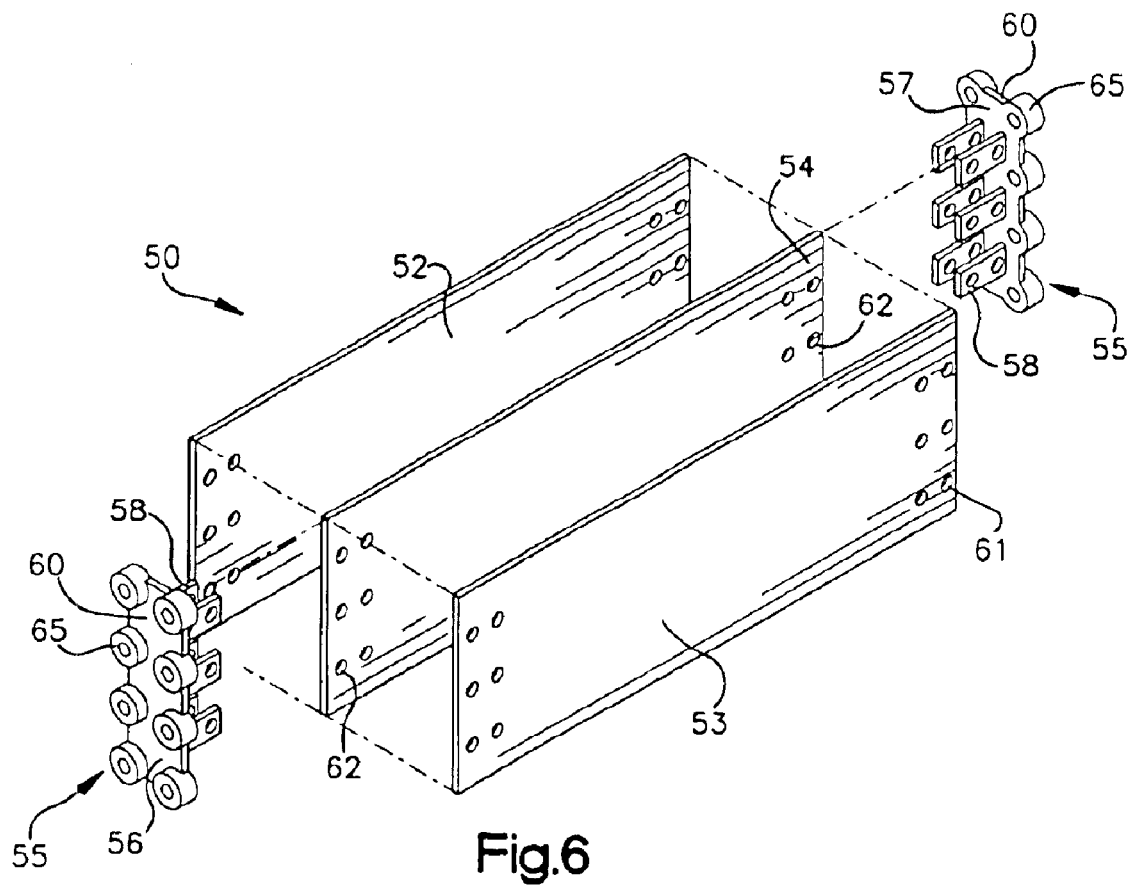
FIG. 6 is an exploded view of one embodiment of the composite cross-member of FIG. 4 in accordance with the present invention.

FIGS. 5 and 6 show another embodiment of the current invention. Composite cross-member 50 includes a center section 51. The center section 51 comprises a first face sheet 52, a second face sheet 53 and a core material sheet 54. The first face sheet 52 and second face sheet 53 contain a plurality of holes 61 positioned at each lengthwise end. The core material sheet includes a plurality of holes 62 that align with the holes 61 in the face sheets. The components of the center section 51 are bonded together to form one structurally unit in one embodiment. The bonding can be accomplished by an adhesive or by any other suitable means as known to those skilled in the art.

The composite cross-member 50 also includes two mounting brackets 55. One mounting member is positioned at each lengthwise end of the center section 51. The mounting brackets 55 include a first portion 56 and a second portion 57. The first portion 56 includes a mounting plate 60 that secures the cross member 50 to a frame rail. The illustrated mounting plate 60 includes a plurality of bosses 65 that space the plate slightly away from the frame rail. The second portion 57 includes a plurality of flanges or fingers 58, which extend orthogonally from said first portion 56. In the illustrated embodiment, two flanges 58 extend from the plate 60 at a fixed distance from one another. Each flange 58 includes a plurality of holes 60 in alignment with the holes at each lengthwise end of the center portion 51. The center portion 51 is positioned and secured between the flanges 58 in the illustrated embodiment. It should be readily apparent to those skilled in the art that the mounting bracket 55 may have only one set of flanges that abuts only face sheet 52. The center portion 51 can be secured to the brackets 55 by fasteners or any other means as known to those of skill in the art. The brackets 55 are then bolted or bonded to the frame rail. In the exemplary embodiment, the bonding of the composite cross-member is accomplished through gluing.

FIG. 7 shows an over-the-highway or off-highway truck frame 100 containing a frame rail including the composite cross-member according to the present invention. The frame includes a first frame rail 101 and a second frame rail 102. The frame rails 101 and 102 are connected by a plurality of composite cross-members 103. The frame rails 101 and 102 may also contain a first bend 104 and a second bend 105. In addition, two other cross-members are present. These additional cross-members are an over the transmission cross-member 106 and a rear closing cross-member 107. A stiffening member 70 is shown in place between two adjacent composite cross-members 103. The stiffening member 70 is connected to the frame rails in such a manner that the two bar portions 71 and 72 of FIG. 8 form an "X" across the span between any two adjacent composite cross members 103. The bar portions 71 and 72 are affixed to the frame rails 101 and 102 as noted above.

FIG. 8 illustrates a frame-stiffening member 70 comprising two bar portions 71 and 72. Bar portions 71 and 72 can be constructed from any number of materials including but not limited to metal, preferably aluminum or steel, composite material and/or plastic. At an end portion 78 of each bar portion 71 and 72 are members 73 that attach the bar portions 71 and 72 to a frame rail. The members 73 can be attached to the frame support member 70 by any number of various means. In one embodiment, for example, the members may be formed at the end portions 78 of the bar portions, welded to the end portions, bonded to the end portions or fastened to the end portions. The members 73 may be cast or formed brackets. The center of each bar portion is connected to the center of the other bar portion. A pin or fastener may be used to hold the bar portions 71 together.

The composite cross-member of the present invention can be used in place of any cross-member in a truck frame. In the illustrated embodiment, composite cross-members of the present invention are used from the second bend 105 back, except for the over the transmission cross-member 106 and the rear closing cross member 107. In one embodiment, the transmission cross-member 106 and/or the rear closing member 107 are replaced with a composite cross-member.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

We claim:

1. In a frame of an over the highway or off-highway truck or tractor wherein said frame comprises first and second frame rails spaced apart by a cross-member wherein the improvement comprises a composite cross-member that includes:
   a) a first face sheet;
   b) a second face sheet; and,
   c) a substantially planar core material sheet positioned between and bonded to said first face sheet and said second face sheet.

2. The cross-member of claim 1 wherein said core sheet is constructed from one of wood, plastic material, aluminum honey-comb material, foam and nomex material.

3. The cross-member of claim 1 wherein said first and second face sheets are constructed from one of metal and plastic.

4. The cross-member of claim 1 wherein said first and second face sheets include an end flange for securing the cross-member to said frame rails.

5. The cross-member of claim 1 further comprising mountings attached to said first and second face sheets and said core material sheet to mount the cross member to the frame rails.

6. In a frame of an over the highway or off-highway truck or tractor wherein said frame comprises first and second frame rails spaced apart by a cross member, a composite cross-member comprising:
   a) a first face sheet wherein said first face sheet includes an end flange at each lengthwise end, said end flange being turned out away from the center of said cross member, said flange including a plurality of holes;
   b) a second face sheet wherein said second face sheet includes an end flange at each lengthwise end, said end flange being turned out away from the center of said cross member, said flange including a plurality of holes;
   c) a core material sheet positioned between said first face sheet and said second face sheet; and,
   d) a "T" shaped mounting member positioned at each lengthwise end of said face sheets, said "T" shaped member includes:
      i. a plate portion including a plurality of holes, said holes being aligned with said holes of said end flanges of said first face sheet and second face sheet; and,
      ii. a central flange portion extending orthogonally from said plate portion between said first and second face sheets toward said core sheet,
   wherein the "T" shaped member at each lengthwise end of said first and second face sheet, said first face sheet, said second face sheet and said core sheet are bonded together.

7. A frame of an over the highway or off-highway truck or tractor, comprising:
   a) two frame rails running generally parallel to one another; and,
   b) a plurality of composite cross-members positioned orthogonally to and connecting said frame rails, each cross-member including:
      i) a first face sheet;
      ii) a second face sheet; and,
      iii) a substantially planar core material sheet positioned between and bonded to said first face sheet and said second face sheet.

8. A frame of an over the highway or off-highway truck or tractor comprising:
   a) two frame rails running generally parallel to one another; and,
   b) a plurality of composite cross-members positioned orthogonally to and connecting said frame rails, each cross-member including:
      i) a first face sheet wherein said first face sheet includes an end flange at each lengthwise end, said end flange being turned out away from the center of said cross member, said flange including a plurality of holes;
      ii) a second face sheet wherein said second face sheet includes an end flange at each lengthwise end, said end flange being turned out away from the center of said cross member, said flange including a plurality of holes;
      iii) a core material sheet positioned between said first face sheet and said second face sheet; and,
      iv) a "T" shaped mounting member positioned at each lengthwise end of said face sheets, said "T" shaped member includes:
         i. a plate portion including a plurality of holes, said holes being aligned with said holes of said end flanges of said first face sheet and second face sheet; and,
         ii. a central flange portion extending orthogonally from said plate portion between said first and second face sheets toward said core sheet,
      wherein the "T" shaped member at each lengthwise end of said first face sheet and said second face sheet, said first face sheet, said second face sheet and said core sheet are bonded together.

9. In a frame of an over the highway or off-highway truck or tractor wherein said frame comprises first and second frame rails spaced apart by a cross-member wherein the improvement comprises a composite cross-member that includes:
   d) a first face sheet;
   e) a second face sheet; and,
   f) a planar core material sheet positioned between said first face sheet and said second face sheet wherein said planar core material sheet is bonded to said first face sheet and said second face sheet with an adhesive.

* * * * *